(12) United States Patent
Johnson et al.

(10) Patent No.: US 6,597,488 B2
(45) Date of Patent: Jul. 22, 2003

(54) TRANSFLECTIVE SWITCHING DISPLAY DEVICE

(75) Inventors: Mark Thomas Johnson, Eindhoven (NL); Hugo Johan Cornelissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 59 days.

(21) Appl. No.: 09/965,450

(22) Filed: Sep. 27, 2001

(65) Prior Publication Data

US 2002/0039224 A1 Apr. 4, 2002

(30) Foreign Application Priority Data

Sep. 28, 2000 (EP) .............................................. 00203380

(51) Int. Cl.$^7$ ................................................. G02F 1/03
(52) U.S. Cl. ........................................ 359/245; 359/290
(58) Field of Search ................................ 359/245, 274, 359/290, 291, 298, 320, 315; 349/113

(56) References Cited

U.S. PATENT DOCUMENTS 6,111,684 A * 8/2000 Forgette et al. ............. 359/267

* cited by examiner

*Primary Examiner*—Scott J. Sugarman
*Assistant Examiner*—Richard Hanig

(57) ABSTRACT

The invention relates to a display operating either in a reflective mode or a transmissive mode and having a high brightness. The display comprises pixel elements (20) having a switchable layer (3), which is switched between a reflecting, a transmissive and an absorbing state by changing a hydrogen content of the switchable layer. Applying a DC voltage on electroconductive layers (11, 13) changes the hydrogen content. These electroconductive layers sandwich a stack of layers comprising the switchable layer (3), which stack has been deposited on a transparent substrate.

7 Claims, 3 Drawing Sheets

TRANSFLECTIVE SWITCHING DISPLAY DEVICE

The invention relates to a display device being operated in a reflective mode or in a transmissive mode and having pixel elements for modulating light.

Display devices operated in a reflective mode or in a transmissive mode are known. For example, transflective LCD displays are operated in two different modes, i.e. a transmissive mode when the display is lit by a backlight placed behind the display, and a reflective mode when the ambient light lights the display. Transflective LCD displays have the drawback that the display has a limited brightness. This is because the pixel elements of the LCD display are generally divided into reflective and transmissive sections, both of which consequently have a small aperture. At best, a transflective LCD display will only have half the reflectivity of a reflective LCD and half the brightness of a transmissive LCD. Furthermore, a cell gap of the display cannot be simultaneously optimized for both the reflective and the transmissive mode, which further reduces the brightness. In addition, conventional LCD displays use a polarizer, which reduces the intensity of the transmitted light by a factor of two.

It is an object of the invention to provide a display device, which has an improved brightness. To this end, the invention provides a display device as defined in claim 1.

Due to the construction of transflective LCDs, at best only half the pixel surface area of each pixel is involved in reflecting light and the other half is capable of transmitting light. Since use is made of the full pixel surface, a switching display device is inherently two times brighter than a transflective LCD. Such a switching display has an even higher brightness, because no polarizer is required.

Advantageous embodiments of the invention are described in the dependent claims.

Switching mirror displays are known from U.S. Pat. No. 5,905,590. Such a display comprises a switching mirror film including hydrides of gadolinium or other trivalent metals. By exchange of hydrogen, the switching film can be reversibly switched from a transparent state to a mirror-like state with zero transmission via an intermediate black absorbing state. The switching film is comprised in a stack of layers, which is deposited on a transparent substrate. By making a pattern in the switching film and providing the patterned switching film with transparent electrodes, a thin display can be manufactured.

However, U.S. Pat. No. 5,905,590 does not disclose that a transflective display with improved brightness can be provided by applying specific surface charge densities to the switching film.

These and other aspects of the invention will be elucidated with reference to the embodiments described hereinafter.

In the drawings.

In general, like reference numerals identify like elements.

Figure 1A:
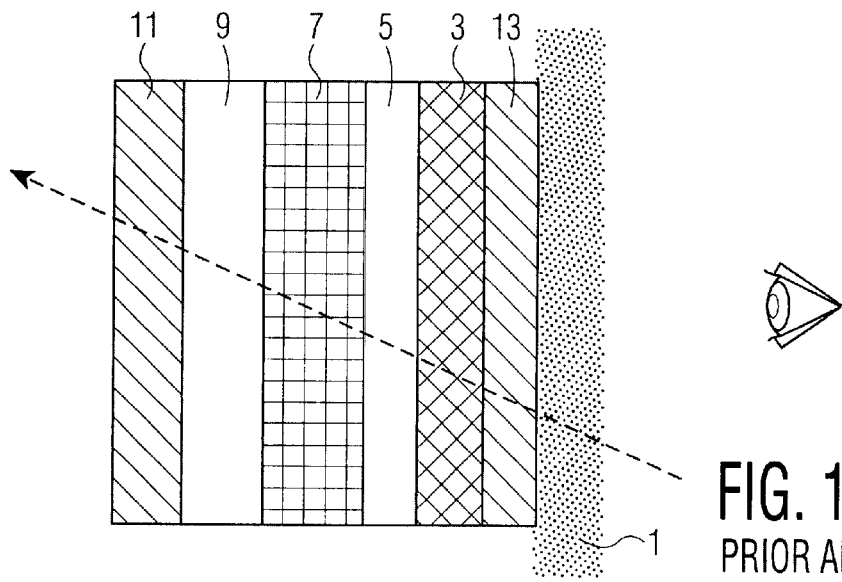
FIGS. 1A, 1B are cross-sections of a stack of layers of a switching mirror display according to the prior art.
Figure 1B:
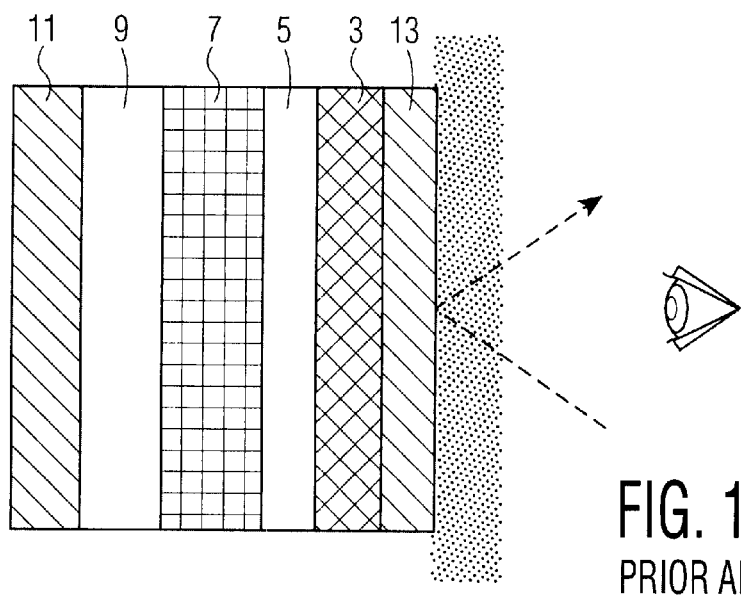

FIGS. 1A, 1B are cross-sections of a switching mirror device according to the prior art. The layer thicknesses are not drawn to scale. The device comprises a transparent glass plate 1 on which a stack of layers is deposited by means of conventional methods, such as vacuum evaporation, sputtering, laser ablation, chemical vapor deposition or electroplating. The stack comprises a layer 3 of $LMgH_x$ (L being an element of the Lanthanide series of the Periodic System of Elements, or Y, Sc or Ni) as a switching film with a thickness of about 200 nm, a palladium layer 5 with a thickness of about 5 nm, a layer 7 of an ion-conducting electrolyte with a thickness in the range of 0.1 to 10 $\mu$m and a hydrogen storage layer 9.

$GdMgH_x$ is a very suitable switching material, as far as optical properties and switching time are concerned, but other trivalent magnesium-lanthanide alloys might be employed as well. The switching film 3 may be reversibly switched between a low-hydrogen (x<~2) composition and a saturated high-hydrogen (x~5) composition. At intermediate H compositions, the film is absorbing in various degrees. In practice, the film is essentially absorbing with hydrogen densities in the range of 2.5<x<4.5. The various compositions have different optical properties. At a low hydrogen content, the film has a metallic character and is non-transparent. The film then reflects like a mirror. At a high hydrogen content, the film 3 is semiconductive and transparent, whereas at intermediate hydrogen concentration the switching film is absorbing.

The palladium layer 5 serves to increase the rate of hydriding or dehydriding, and thus the switching speed. Other electro-catalytic metals or alloys, such as platinum or nickel might also be used. In addition, this metal layer protects the underlying switching film 3 against corrosion by the electrolyte. The palladium layer 5 may have a thickness in the range between 2 and 25 nm. Thin layers of 2 to 10 nm are preferred, however, because the thickness of the film determines the maximum transmission of the switching device.

For a proper functioning, also an H-storage layer 9 and an H-ion conducting electrolyte layer 7 are required. A good H-ion conductor electrolyte is $ZrO_2H_x$. The electrolyte must be a good ion conductor, but it must be an isolator for electrons in order to prevent self-discharge of the device. Use is most preferably made of transparent solid-state electrolytes, because of the simplicity of the device; they prevent sealing problems, and the device is easier to handle.

If the transparent state of the switching mirror is required, a good candidate for the storage layer is $WO_3$.

The stack is sandwiched between two transparent electroconductive electrode layers 11, 13 of, for example, indium-tin oxide (ITO). Electrode layers 11, 13 are connected to an external current source (not shown). By applying a DC current, the low-hydrogen, mirror-like composition is converted to the high-hydrogen composition, which is transparent and neutral gray. The device now acts as a transparent window, as is shown in FIG. 1A by means of the dashed line. When reversing the current, the switching film 3 returns to the low-hydrogen state, which is mirror-like and non-transparent, as is shown in FIG. 1B. The switching time is comparable to that of conventional electrochromic devices. The device can operate at room temperature. Once the mirror has reached the desired optical state, virtually no current will flow through the device. This means that the display will hold information with a very low power.

The present invention is based on the recognition that the switching mirror effect can be advantageously used to provide a transflective display with improved brightness.

There are several embodiments possible, depending upon which of the 3 states (reflective, transparent, absorbing) schematically shown in FIGS. 5 A,B,C is used. The various embodiments for the reflective mode are shown in the left part of these Figures, indicated by L, whereas the various embodiments for the transmissive mode are shown in the right part, indicated by R. The arrows indicate the path of light within the display for the various modes of the display and states of the pixels.

Figure 5A:
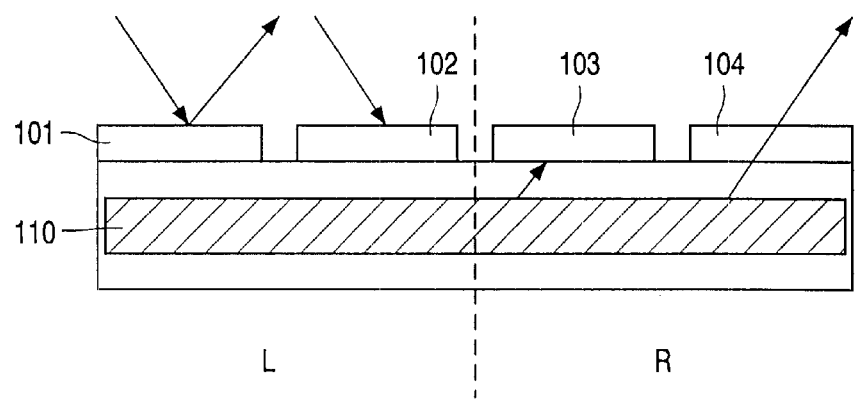
FIGS. 5A, 5B, 5C show schematically various embodiments of the device according to the invention.

In a first embodiment, shown in FIG. 5A, the reflective mode (L) uses the reflective and absorbing states, whilst the transmissive mode (R) uses the transmissive and absorbing states. In this manner, a good contrast is ensured in each state. Pixel 101 indicates the reflective state and pixel 102 indicates the absorbing state.

In the transmissive mode (R), light coming from a backlight 110 is transmitted by pixel 104, while the light is absorbed by pixel 103. With respect to a point of view of a person watching the display, the backlight is positioned behind the pixels (101–104).

Figure 5B:
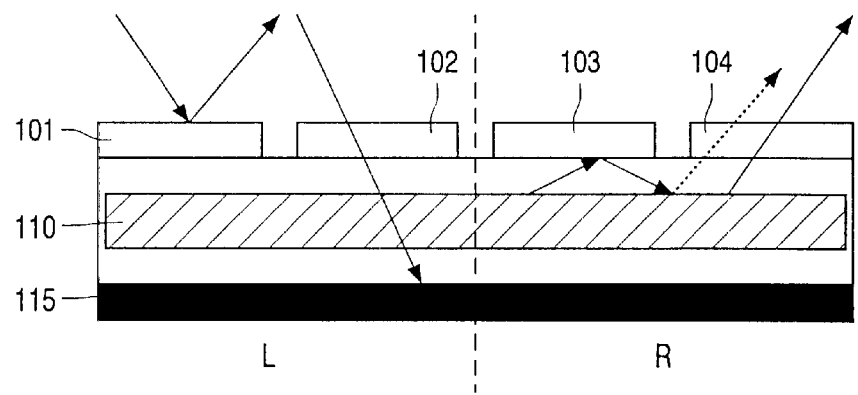

A second embodiment, shown in FIG. 5B, uses only the reflective and transmissive states. The reflective mode (L) uses an absorbing background 115 to create black pixels, whereas the pixels are switched from the reflective state 101 to the transmissive state 102. The transmissive mode (R) also uses the reflective state 103 and the transmissive state 104, in which the pixels in the reflective state block the light and create black pixels. Some of the light reflected back to the backlight region is re-used to increase the brightness of the display still further (indicated by the dashed arrow). Due to the fact that only two of the three switching states of the pixels are used, viz. the reflective and the transmissive states, the display only needs to be switched by two values of the surface density. This will simplify the electronics required for driving the display.

In a third embodiment, shown in FIG. 5C, again use is made of the reflective, transparent and absorbing states. In this case, whilst the reflective mode (L) again uses the reflective state 101 and the absorbing state 102, the transmissive mode (R) now uses the reflective state 103 and the transmissive state 104. The reflective mode has a similarly good performance as in the first embodiment, but now it is possible in the transmissive mode to fully exploit the recycling of the light reflected back to the backlight region. This will further increase the brightness of the display.

The three embodiments require a front scattering film, or similar optical component, to convert the reflective state into a white state as required in the usual display applications (i.e. black/white or full color displays with color filters). Alternatively, the structure of the reflecting layer could be intentionally roughened to create the desired scattering reflection to provide a white or black looking reflective state.

Figure 5C:
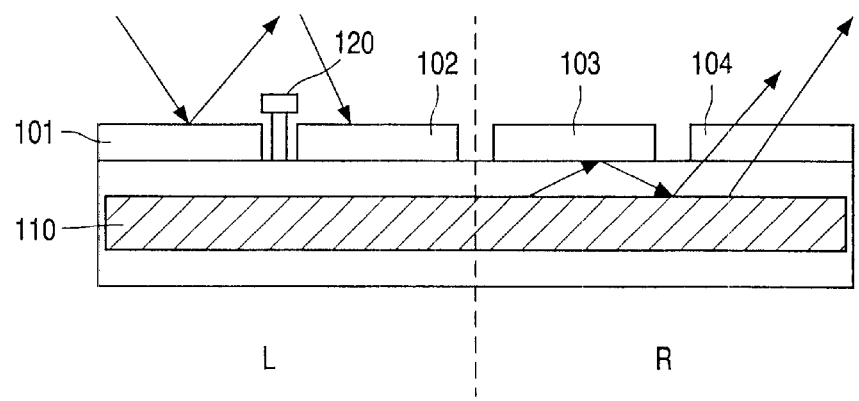

In the embodiments of FIGS. 5B and 5C, the recycling of the reflected light in the transmissive mode (R) can be optimized in a variety of manners by structuring the underside of the reflector, the housing of the backlight, or by adding foils to the area of backlight/reflector.

A further embodiment of the display incorporates a light sensor (such as a photodiode, shown as element 120 in FIG. 5C), which switches the display between the reflective mode or the transmissive mode depending upon the ambient light situation to optimize brightness, contrast and power dissipation requirements.

Figure 2:
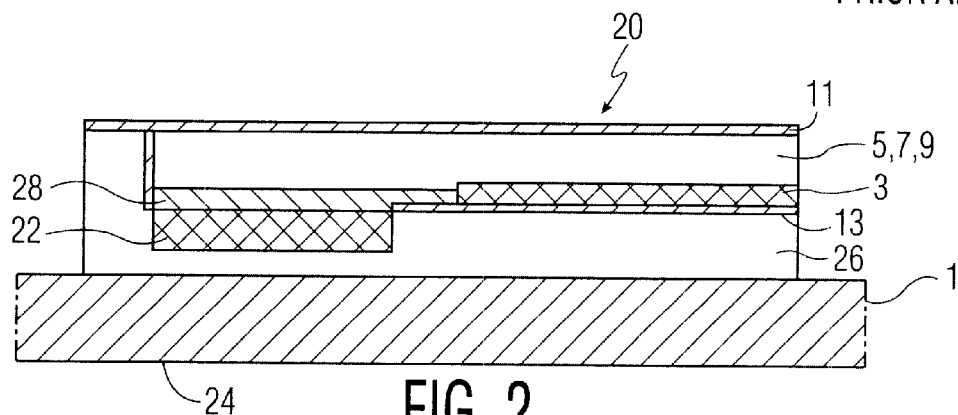
FIG. 2 is a cross-section of a pixel element of a switching mirror display according to the prior art.

Turning now to FIG. 2, a problem with the switching mirror device according to the prior art is that an element 22 of an active matrix is visible at the viewable side 24 of pixel element 20, i.e. the side from which the display is viewed.

This active matrix (Thin Film Transistors, rows, columns, storage capacitors, etc.) comprises the electric elements that are necessary for switching the pixel elements. The active matrix is embedded in an embedding layer 26, which is also comprised in the pixel element. The active matrix is electrically connected to the electrode layers 13, 15. An isolation layer 28 isolates the active matrix element 22 from the layers of the stack.

In the configuration according to the prior art, the surface area occupied by the active matrix cannot be used for the optically active layer 3. This reduces the aperture of the display if the display is viewed from the viewable side 24. In particular, as the driving circuits are relatively complex and since the transistors are preferably made relatively large in order to handle the high currents needed for charging the switching mirror display, the aperture is relatively small.

Figure 3A:
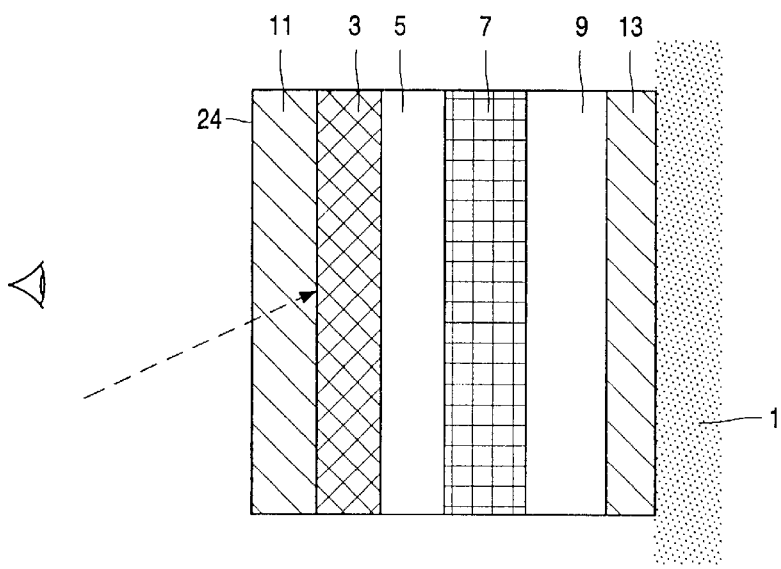
FIGS. 3A, 3B show a stack of layers of a switching mirror display according to the invention.
Figure 3B:
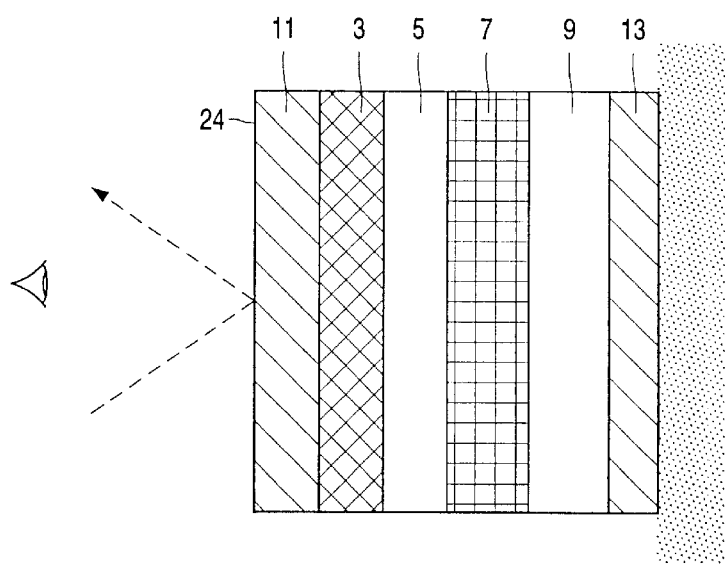

FIGS. 3A, 3B show a stack of layers of a switching mirror display according to the invention. In this case, the display is viewed from a side 24 of the substrate on which the stack is deposited. The order of the stack comprising the switching layer 3 has been reversed. This means that, in an order starting from the surface of the substrate, the stack comprises a first layer for storing hydrogen 9, a second layer for conducting hydrogen 7 and the switchable layer 3.

The stack is sandwiched between electroconductive electrode layers 11 and 13. The optically switchable material 3 is switched from a state of reflecting light to a state of absorbing light by changing a density of hydrogen. Applying a DC voltage on the electroconductive layers changes the density of hydrogen.

Good results were obtained with a stack of layers wherein the second layer comprises an electrolyte material, e.g. $ZrO_2H_x$, a separation layer 5 being present between the second layer 7 and the switchable layer 3, and the first layer 9 comprises $GdMgH_x$.

Figure 4:
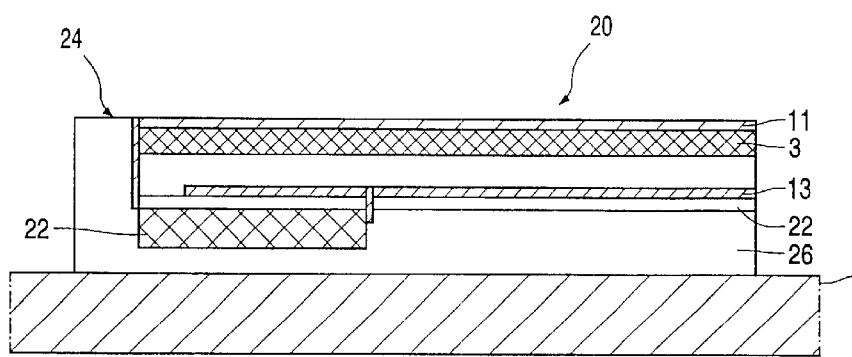
FIG. 4 is a cross-section of a pixel element of a switching mirror device according to the invention.

FIG. 4 is a cross-section of a pixel element 20 according to the invention. The order of the layers of the stack is reversed (as shown in more detail in FIGS. 3A, 3B) and the switching layer 3 extends across the active matrix element 22. The electric switching means are thus positioned behind the layer of optically switching material with respect to the viewable side 24 of the display device. When the switching layer is switched from a reflecting state to an absorbing state and reversibly, the active matrix element 22 is not visible. Since the active matrix element no longer determines the aperture in the reflective state, the display is brighter.

Since the transparent state of the switching mirror is not required, a second $LMgH_x$ layer (L being Y, Sc or Ni, or an element from the Lanthanide series of the Periodic System of Elements, e.g. Gd) can be used as a storage layer. This will result in a symmetric device, which has the advantage that the device can be thinner.

Both theoretically as well as experimentally, it has been shown that for a 100 nm thin $Gd_{40}Mg_{60}$-hydride layer a charge of about 0.1 $C/cm^2$ is needed to transport all hydrogen from one layer to another in order to switch between the transparent and the reflecting state. For switching only between the reflecting and the absorbing state, less H has to be transported (requiring between 0.15 and 0.85 $C/cm^2$). This charge density will also scale with the layer thickness. Moreover, for switching between the reflecting and the absorbing state, less charge (H-ions) needs to be transported, i.e. less current is needed for switching.

A symmetric device may be used for an application where only switching between the reflective and absorbing state is necessary. If the viewable side 24 of the display device is provided with a scattering foil, the contrast of the display is improved. Due to the presence of the foil, switching-mirror pixels in the reflecting state will look white, whereas switching mirror pixels in the absorbing state will look black. Such a type of display may be used as, e.g. a document reader. This principle, combined with color filters, will yield a full color document reader.

In summary, the invention relates to a display operating either in a reflective mode or a transmissive mode and having a high brightness. The display comprises pixel elements 20 having a switchable layer 3, which is switched between a reflecting, a transmissive and an absorbing state by changing a hydrogen content of the switchable layer. Applying a DC voltage on electroconductive layers 11,13 changes the hydrogen content. These electroconductive layers sandwich a stack of layers comprising the switchable layer 3, which stack has been deposited on a transparent substrate.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim.

What is claimed is:

1. A display device being operated in a reflective mode (L) or in a transmissive mode (R) and having pixel elements (101–104) for modulating light, said pixel elements comprising:

a stack of layers including a switchable layer (3) of an optically switchable material which switches the pixel elements (101–104) from a first state to a second state, the second state being different from the first state, the first state and the second state being one of the following states:

a reflective state, a transmissive state or an absorbing state; and means for modulating light in the reflective mode (L) by switching from a reflective state to a non-reflective state, and for modulating light in the transmissive (R) mode by switching from a transmissive state to a non-transmissive state, the non-reflective state being the transmissive state or the absorbing state and the non-transmissive state being the reflective state or the absorbing state, the means for modulating light comprising electric switching means (22) for bringing said switchable layer (3) into the transmissive state by applying a surface charge density of substantially −Q to the switchable layer (3), into the reflective state by applying a surface charge density of substantially +Q to the switchable layer, and into the absorbing state by applying a surface charge density between +0.15 Q and +0.85 Q, respectively, to the switchable layer.

2. A display device as claimed in claim 1, wherein a value of Q is in the range of 0.05 to 0.15 Coulomb/cm$^2$ per 100 nm of thickness of the switchable layer (3).

3. A display device as claimed in claim 1, wherein, in the reflective mode (L), the pixels are switched from the reflective state to the absorbing state and, in the transmissive mode (R), the pixels are switched from the transmissive state to the absorbing state.

4. A display device as claimed in claim 1, wherein, in the reflective mode (L), the pixels are switched from the reflective state to the transmissive state and, in the transmissive mode (R), the pixels are switched from the reflective state to the transmissive state.

5. A display device as claimed in claim 1, wherein, in the reflective mode (L), the pixels are switched from the reflective state to the absorbing state and, in the transmissive mode (R), the pixels are switched from the reflective state to the transmissive state.

6. A display device as claimed in claim 1, wherein the stack of layers is deposited on a surface of a substrate (1), the stack comprising, in an order starting from the surface of the substrate (1), a first layer for storing hydrogen (9), a second layer (7) for conducting hydrogen, and the switchable layer (3), the optically switchable material being switched by changing a density of hydrogen.

7. A display device as claimed in claim 1, wherein the display comprises a light sensor (120) for controlling switching of the display between the reflective mode (L) and the (R) transmissive mode depending upon an ambient light situation.

* * * * *